United States Patent [19]

Corso, III et al.

[11] Patent Number: 6,058,182

[45] Date of Patent: May 2, 2000

[54] COMMUNICATIONS SWITCH PERMITTING TRANSPARENT MAINTENANCE OF SWITCH CONTROL SYSTEM

[75] Inventors: Martin Corso, III, Aurora; Nicholas D. De Trana, Addison; Craig L. DeCaluwe, Naperville; Beverly A. McKinney, Aurora; Gene R. Turek, Naperville, all of Ill.

[73] Assignee: AT&T Corporation, New York, N.Y.

[21] Appl. No.: 08/966,292

[22] Filed: Nov. 7, 1997

[51] Int. Cl.[7] ............................................. H04M 7/14
[52] U.S. Cl. ................................. 379/279; 370/217
[58] Field of Search ........................... 379/219, 220, 379/221, 279, 242; 370/216, 217, 218

[56] References Cited

U.S. PATENT DOCUMENTS

| | | | |
|---|---|---|---|
| 4,979,164 | 12/1990 | Ardon | 379/279 |
| 5,016,244 | 5/1991 | Massey, Jr. et al. | 370/217 |
| 5,115,425 | 5/1992 | Ardon | 370/217 |
| 5,784,449 | 7/1998 | Ardon | 379/279 |
| 5,805,690 | 9/1998 | Koepper et al. | 379/221 |
| 5,841,780 | 11/1998 | Bales et al. | 370/217 |
| 5,848,053 | 12/1998 | Ardon | 379/221 |

*Primary Examiner*—Scott Wolinsky
*Attorney, Agent, or Firm*—Kenyon & Kenyon

[57] ABSTRACT

A switch architecture that permits maintenance of switch signaling interfaces in switches for communication networks. The architecture provides a spare switch signaling interface that is enabled when a regular switch signaling interface is disabled. A switch matrix routes signaling channels from their dedicated position in a trunk to the spare switch signaling interface when the spare is enabled. A control processor updates a memory log associating the signaling channel and the trunks from which they originate with the spare switch signaling interface.

20 Claims, 2 Drawing Sheets

COMMUNICATIONS SWITCH PERMITTING TRANSPARENT MAINTENANCE OF SWITCH CONTROL SYSTEM

The present invention relates to switching equipment for communications systems and, more particularly, to a switch architecture that permits equipment maintenance and installation to be performed on a switch without interruption in communication services to customers.

BACKGROUND OF THE INVENTION

In integrated services digital network ("ISDN") applications, a customer is interconnected with a communications network through a trunk line, such as a T1 trunk. Shown in FIG. 1, a T1 trunk 10 ("T1") contains 24 channels multiplexed according to time division multiplexing. The T1 uses out-of-band signaling: Of the 24 channels, a single "D" channel contains control signaling that is necessary for the customer to interact with the communications network. For example, call set up and tear down is accomplished via the D channel. The D channel occupies a specific time slot on the T1. The remaining 23 "B" channels contain voice, data or any kind of user communications data.

FIG. 1 illustrates the architecture of an end office switch 20 in known communication networks. An end office switch is a communication network switch connected directly to a customer. The customer's communication equipment, such as a telephone, computer, facsimile machine or a private branch exchange, interfaces with the end office switch 20. The end office switch 20 is the first of what may be several switches that route calls through the network.

T1's also interconnect switches within a communication network. In long distance telecommunication services, a call may be routed by several switches to connect the two parties to the call. A call may be assigned to a first time slot on a first T1, between the customer and the original switch then routed to a second time slot on a second T1 by a first switch. A second switch connected to the first switch by the second T1 may route the call to a third switch on a third time slot on a third T1. A call experiences as many switching stages as are necessary to route a call to its destination. The T1s interconnecting the switches may also use out-of-band signaling, providing a separate path as a signaling channel to communicate control information between the switches.

The end office switch 20 includes a plurality of digital interface units 30 ("DIUs"), also known as "T1 interface units," in communication with a switch matrix 25, such as a time division switched network (TDSN). One DIU 30 interconnects a plurality of T1s to the TDSN. For example, in the 4ESS switch available from Lucent Technology, Inc., a DIU 30 interfaces with as many as five T1's. Some of the T1's may connect to customers as described above, others may connect to other switches within the network. In the 4ESS, the output of the DIU is another trunk carrying 120 multiplexed time slots. The 120 multiplexed time slots are input to the TDSN.

The switch 20 contains a switch signaling interface 40 ("SSI"). The SSI 40 is a hardware element that permits the switch 20 to monitor and respond to control signals contained within the D channel of the trunks 10 connected to the switch 20. The switch 20 routes the D channels of the T1's input to the DIU 30 to a single SSI 40. Each SSI 40 includes a T1 facility access 41 (T1FA), three node processors 42, and six line interfaces 43. The SSI is organized as three packets, each including a pair of line interfaces 43 and one node processor 42, that serve up to eight customers. A failure of the T1FA causes the switch 20 to be isolated from the 24 D channels of various trunks; failure of a packet causes the switch to lose track of eight D channels. Alternatively, the switch 20 may interface with a high density switch signaling interface("HD") 50 as a substitute for the SSI 40. A particular switch 20 may contain more than one SSI 40 or HD 50 (not shown).

The switch 20 can switch any time slot from any T1 to any time slot of any other T1. However, the switch 20 establishes a dedicated pathway that routes the D channels of the T1's to the SSI 40. As traffic on a single T1 10 enters the switch 20, the DIU 30 multiplexes the channels of the T1 with channels from the other T1's connected to the DIU 30. The DIU 30 generates an output carrying the multiplexed output of the several T1's. The switch 20 switches the D channels contained in the DIU output to the SSI 40. Also, D channels from other DIUs 30 may be switched to the same SSI 40. A control processor (not shown) interfaces with the SSI 40 to monitor the status of the D channels and execute commands contained therein.

The architecture of these known switches suffer from a disadvantage because SSI maintenance disables the trunks that the SSI 40 services. If the switch 20 is an end office switch, SSI maintenance causes an interruption in service to the customer. During maintenance, all or part of the SSI 40 is disabled, severing the connection between the SSI and the D channels and isolating the D channels from the control processor. Depending upon the type of maintenance, either an individual packet or the T1FA 41 is disabled, disconnecting from eight to twenty-four customers. Because customers expect and demand continuous, uninterrupted communication service, a communication service provider may notify and negotiate maintenance times with its customers. Using the current architecture, the provider must negotiate a single time when up to twenty-four customers consent to termination of service. Customers rarely entertain such negotiations with good humor.

Accordingly, there is a need in the art for a switching architecture that permits SSI maintenance without interruption of customer service.

SUMMARY OF THE INVENTION

The disadvantages of the prior art are alleviated to a great extent by a switch architecture that introduces a spare SSI to the switch. During maintenance, the switch changes the routing assignment of the D channels assigned to the SSI. The D channels are routed to the spare SSI. Alternatively, if SSI service disables only a portion of the SSI, the D channels of that portion could be rerouted to the spare SSI. The present invention achieves a benefit of permitting maintenance to be made to an SSI without requiring the customer service provider to negotiate a maintenance schedule with its customers. Indeed, maintenance of SSI under the present invention goes unnoticed by the customer.

DETAILED DESCRIPTION OF THE PRESENT INVENTION

Figure 1:
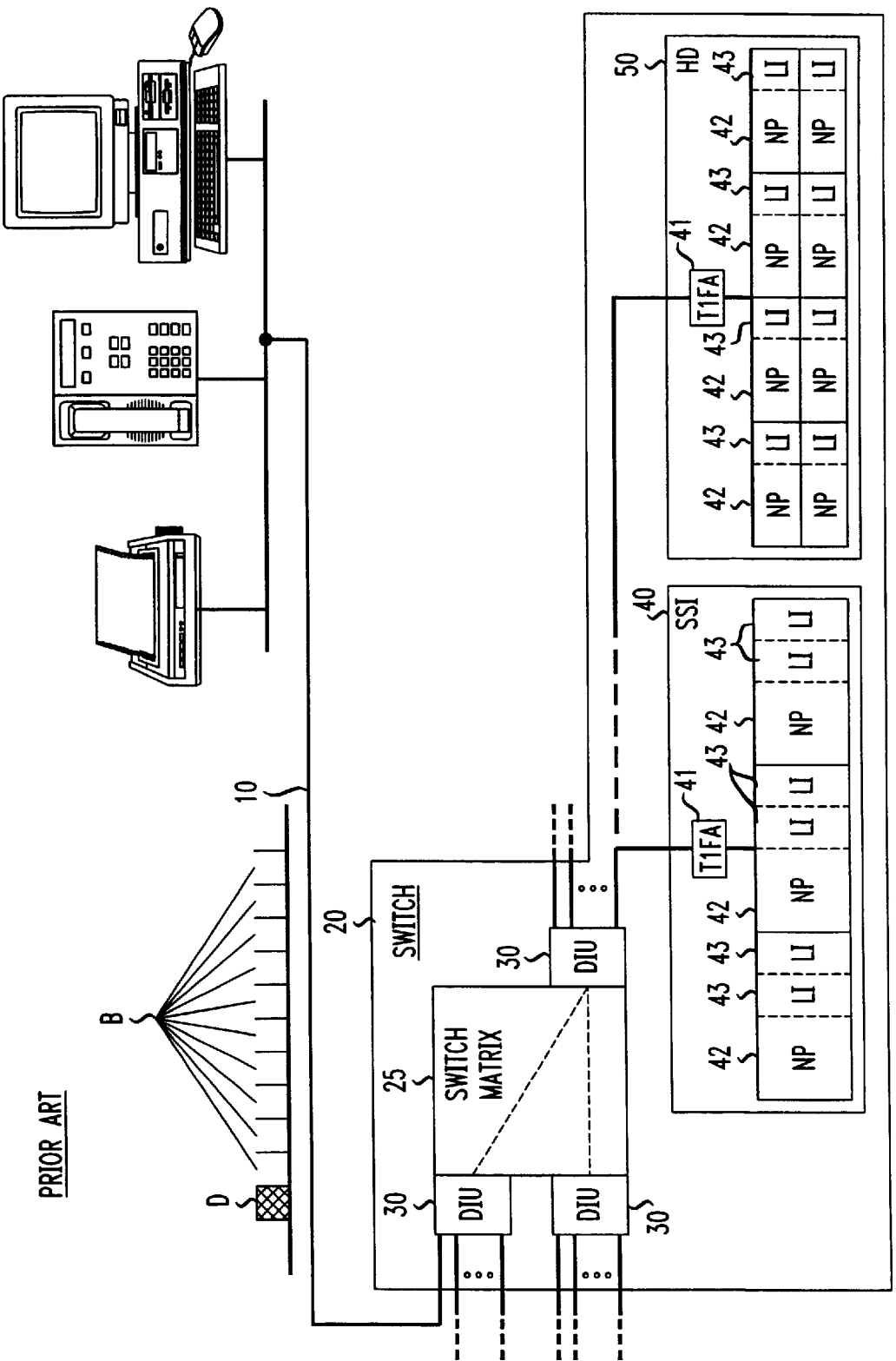
FIG. 1 is a schematic drawing of the current switching architecture.
Figure 2:
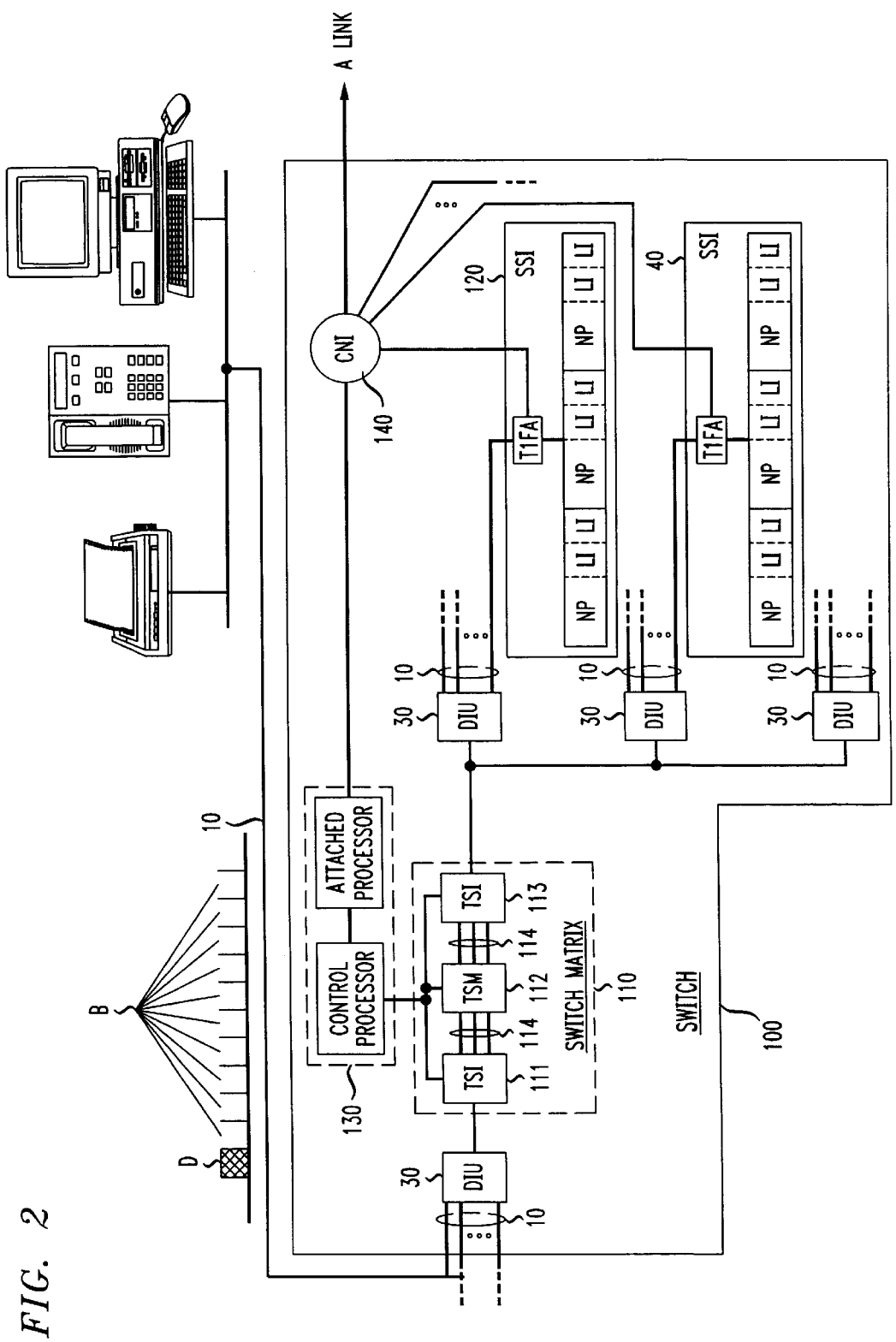
FIG. 2 is a schematic drawing of the switching architecture of the present invention.

The architecture of a switch 100 constructed in accordance with the present invention is shown in FIG. 2. A switch matrix 110 interconnects with a plurality of DIUs 30 which, in turn, are interconnected with the T1's 10. A spare SSI 120 shelf is provided in communication with one of the DIUs 30. The spare SSI 120 is identical to other SSIs in all respects.

The structure of the switch matrix 110 is shown in FIG. 2. A switch matrix 110 is a three stage switch including a first time slot interchange 111 ("TSI"), a time multiplex switch 112 ("TMS") and a second time slot interchange 113. The TSIs 111, 113 reorganize time slots of a trunk carrying the multiplexed output from a DIU 30. The TMS 112 switches time slots from one trunk 114 to another. Using the three stage switch matrix 110, data in any time slot from any T1 10 may be switched to any time slot of the same or any other T1 10.

The control architecture of the switch is shown in FIG. 2 as well. The switch 100 includes a hierarchy of a control processor and an attached processor that collectively operate as a control processor 130 to configure the switch. The control processor 130 causes the switch matrix 110 to route calls among the T1's. The control processor 130 maintains a memory log (not shown) that associates the D channels in the SSIs 40 (multiple SSIs not shown) with their associated T1's. The D channels are read from the SSI 40 to the control processor 130. When the control processor 130 decodes an instruction contained in a D channel, it refers to the memory log to identify the T1 on which the instruction should be executed, and executes the instruction on that T1.

The SSI shelves are in communication with a control network interchange 140 ("CNI"). The CNI 140 is linked to signal transfer points (not shown) over A links that provide connections to other switches in the communication network. The CNI also connects to the control processor 130 of the switch itself.

To service an original SSI 40, the switch 100 reassigns the D channels assigned to the original SSI 40. The D channels are assigned to the spare SSI 120. The control processor 130 causes the switch matrix 110 to route the D channels from DIU 30 to the DIU 30 associated with the spare SSI 120. The control processor 130 updates the memory log relating the spare SSI 120 to T1's 10 to reflect the new assignments for the D channels. From the spare SSI 120, the switch processors 130 read signaling contained in the D channel and perform network operations as appropriate. Switching from the original SSI 40 to a spare SSI 120 occurs without loss of data and is transparent to the customers serviced by the reassigned D channels.

After the D channels are routed to the spare SSI 120, a system operator is free to conduct whatever operations are necessary on the original SSI 40. Upon conclusion of the SSI maintenance, the system operator may return the D channels from the spare SSI 120 back to the original SSI 40. However, the D channels need not be switched back; instead, the original SSI 40 may sit "in reserve" as the "spare SSI" and remain idle until other SSIs are scheduled for maintenance.

The switch architecture also permits instantaneous recovery from an SSI equipment failure. If the control processor 130 detect an equipment failure in an SSI 40, the processor 130 may switch the D channels from the failing SSI 40 to the spare SSI 120. Thus, the switch 100 may recover from loss of an SSI 40 with minimal interruption of customer service.

The description of the present invention has been made in the context of 4ESS switch, a product of Lucent Technologies. However, the principles of the present invention find application with a host of other switches found in communication networks. Also, the present invention may find application with any kind of trunk using out-of-band signaling, not merely T1 trunks.

We claim:

1. A communications switch, comprising:
    a switch matrix,
    a control processor,
    a plurality of interface units each interfacing at least one trunk to the switch matrix, each of said trunks having at least one channel carrying control signaling,
    a first switch interface that interfaces the control signaling from a plurality of the trunks to the control processor, the first switch interface provided in communication with the switch matrix and the control processor, and
    a second switch interface that interfaces the control signaling from a plurality of the trunks to the control processor the second switch interface selectively provided in communication with the switch matrix and the control processor,
    wherein the second switch interface is enabled when the first switch interface is disabled.

2. The communications switch of claim 1, wherein the switch matrix routes control signaling of the trunks to the second switch interface.

3. The communications switch of claim 2, wherein the control processor causes the switch matrix to route control signaling of the trunks to the second switch interface.

4. The communications switch of claim 3, further comprising a memory log associating the first switch interface with the trunks associated with the control signaling,
    the control processor updates the memory log to associate the second switch interface with the trunks associated with the control signaling.

5. The communications switch of claim 2, wherein the control processor disables the first switch interface for maintenance.

6. The communications switch of claim 2, wherein the control processor disables the first switch interface upon detection of a failure of the first switch interface.

7. The communications switch of claim 1, wherein the first switch interface receives the control signaling from the trunks through the switch matrix.

8. The communications switch of claim 7, wherein the switch matrix routes a predetermined control channel containing the control signaling from each of the trunks to the first switch interface.

9. The communications switch of claim 1, wherein the communications switch is an end office.

10. The communications switch of claim 1, wherein the first switch interface comprises a switch signaling interface.

11. A method, implemented within a communication switch, of maintaining switch integrity comprising the steps of:
    receiving control channels over a plurality of trunks,
    assigning a plurality of the control channels to a first switch interface of the communication switch,
    routing the assigned control channels to the first switch interface,
    determining when a disabling event occurs with respect to the first switch interface, and
    when a disabling event occurs, re-routing the assigned control channels of the trunks to a second switch interface of the communication switch.

12. The method of claim 11, wherein the disabling event is equipment malfunction of the first switch interface.

13. The method of claim 11, wherein the disabling event is maintenance of the first switch interface.

14. The method of claim 11, wherein the disabling event is triggered manually by a system operator.

15. The method of claim 11, wherein a switch matrix routes the control channels of the trunks to the first switch interface.

16. The method of claim 15, wherein the switch matrix routes the control channels from predetermined time slots on the trunks to the first switch interface.

17. The method of claim 11, wherein a control processor causes a switch matrix to route the control channels to the second switch interface.

18. The method of claim 17, wherein the control processor detects a failure of the first switch interface.

19. The method of claim 17, wherein the control processor updates a memory log to associate the second switch interface with the trunks associated with the control channels.

20. In a communications switch for connecting channels on a plurality of trunks with other channels of the trunks, said trunks using out-of-band signaling, said switch comprising a control processor and a first switch interface that interfaces the out-of-band signaling from the trunks with the control processor, an improved switch architecture, comprising:

a second switch interface that interfaces the out-of-band signaling from the plurality of the trunks to the control processor, the second switch interface provided in selective communication with the control processor, wherein the communications switch enables the second switch interface when the first switch interface is disabled.

* * * * *